UNITED STATES PATENT OFFICE 2,060,311

METHOD OF MAKING COLLOIDAL SULPHUR

Tadaichi Hashimoto, Tujunga, Calif., assignor to Chemical Products, Inc. of California, a corporation of Nevada No Drawing. Application June 3, 1935, Serial No. 24,731

3 Claims. (Cl. 252—6)

This invention has to do in a general way with the production of colloidal sulphur and is more particularly related to an improved method for producing the same whereby the cost of production is materially reduced and the recovery of the product is substantially increased.

Although colloidal sulphur and its various uses and properties, particularly those of a medicinal, pharmaceutical and fungicidal character, have long been known, the economical production of this material has always been a problem in the chemical art. For example, one method which has heretofore been deemed most satisfactory has involved the treatment of an alkaline solution of a sulphide or polysulphide with acid. The acid reacts with the sulphide or polysulphide contained in the solution to form hydrogen sulphide gas and to release free sulphur according to the following reaction:

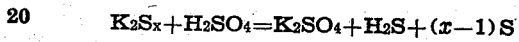
$$K_2S_x + H_2SO_4 = K_2SO_4 + H_2S + (x-1)S$$

Although most of the sulphur precipitated through the above reaction is in a coarse or granular form which does not possess colloidal properties, it has been found that if the reaction is not carried to completion part of the sulphur remains in colloidal suspension, and in past practice advantage is taken of this fact to recover such colloidal sulphur. Since the sulphur in suspension is colloidal, the usual methods of filtration or centrifuging cannot be employed to effect its separation from the solution and the salts and gas contained therein. For this purpose it has been necessary to resort to the use of dialysis or ultrafiltration which, as is well known to those familiar with the art, involves a slow and expensive operation and, further, inasmuch as only a portion of the released sulphur can be recovered, the reaction not going to completion and the precipitated material not being available as a colloidal substance, it will be seen that such colloidal sulphur as is recovered is, due to the process of extraction, very costly.

The process contemplated by this invention employs the same general chemical reaction referred to above. That is, the sulphur which is to be recovered as a colloidal material is released from combination in a solution by the addition of an acid or acid forming material. The material used may be a sulphide or polysulphide or may be in the form of hydrogen sulphide gas, and the term "sulphide," as it will be used herein, is intended to refer to any compound of sulphur from which free sulphur can be released by an excess of acid in solution.

As was pointed out above, the reaction above referred to is effective to precipitate sulphur, but the sulphur precipitated is composed of particles of dimensions greater than those necessary for colloidal suspension. It therefore becomes a primary object of this invention to employ, in conjunction with the above reaction, an additional reagent which will react as an emulsifying agent or emulsoid and which may also be referred to as a protective colloid, such reagent having the reversible characteristics whereby it is coagulated in acid solution and is dispersed in alkaline solution.

In other words, the process of this invention contemplates the use in the sulphide solution of a colloidal or emulsoidal material which is dispersed in alkaline solution and is coagulated in acid solution and which possesses the peculiar property of forming a protective colloid for the sulphur.

Various materials may be used in this connection. For example, I have found casein to be a very satisfactory material, but the invention is not in any way limited to this particular material, since other emulsoidal or protective colloidal materials, having the reversible property above referred to, may be used to equal advantage. For example, various forms of proteins, which go into suspension or solution in alkaline solutions and coagulate in acid solutions, such as gluten, albumen, etc., may be used with satisfaction. In treating an alkaline sulphide solution which contains a protective colloid of this character, I have discovered that, as the protective colloid is coagulated, it carries down with it, as a precipitate, sulphur particles of colloidal dimensions. This "mixture" is precipitated as a coagulated mass which can be separated from the solution by the ordinary methods of filtration or centrifugalization, and which can be washed and dried in the usual manner. Since the sulphur is present in the mass, thus extracted, in the form of colloidal particles, and since the protective "coagulate" is dispersed in alkaline solution, it will be seen that a true suspension or solution of colloidal sulphur can be obtained from the material at any time, whether it is wet or dry, merely by mixing a desired quantity of the material with a slightly alkaline solution, wherein the protective colloid is dispersed and the sulphur also is suspended in colloidal solution.

As an example of a preferred procedure followed in the practice of my invention, I dissolve any predetermined quantity of sulphide (or polysulphide or mixture of the two), of an alkali or alkaline earth, in water. To this solution I add a small quantity of an alkali or alkaline earth salt of casein. The quantity of casein added may vary within relatively wide limits, and I have found that very satisfactory results can be obtained by using an amount of casein equivalent to from 0.2% to 2% by weight of casein calculated on the basis of the sulphur present. Also the concentration of the sulphide in the solution may be varied, but I have found that by using a relatively dilute solution the particles are correspondingly small.

After the solution has been formed in this way I next add slowly a dilute solution of a suitable acid, such as hydrochloric or sulphuric acid, and continue the addition of such acid until the reaction of the solution on litmus paper shows distinct acidity. During the slow addition of the acid, free sulphur is released according to the reaction given above, and at the same time the casein (or other protective colloid present) starts to coagulate and precipitate from the solution. As pointed out above, I have found that as the casein coagulates it immediately attaches itself to released sulphur particles of colloidal dimensions and carries them down with it in a curd, leaving a clear solution on top. This coagulated mass or curd is then ready for separation either by centrifugalization or filtration and may be washed with water until free from mineral acids, salts and hydrogen sulphide.

After the curd or precipitate has been filtered and washed, it may if desired be dried and can be converted into a colloidal solution or suspension at any time by mixing the same with a dilute alkaline solution. For example, to suspend the coagulated mass which contains the colloidal sulphur it is merely necessary to add a small quantity of any alkali or alkaline earth solution such as sodium, potassium or calcium hydroxide or carbonate and mix thoroughly. This whole mass forms a thick paste which will suspend freely and uniformly in water.

As has been previously indicated, the chief advantage of the process contemplated by this invention is the elimination of the necessity of using dialysis or ultrafiltration to free the colloidal sulphur from the salts of the acid as well as the hydrogen sulphide which are formed in the reaction. Since ordinary filtration, with or without suction, or centrifugalization can be used for this purpose in the process of my invention, and, as has previously been indicated, since substantially all of the sulphur present in the original solution can be recovered as a colloidal material, it will be seen that the process of my invention is capable of producing colloidal sulphur much more economically than has been possible by methods heretofore practiced.

It is to be understood that, while I have herein described in detail one preferred procedure which may be followed in the process contemplated by this invention, the invention is not limited to the precise procedure or the specific materials referred to herein but includes within its scope such changes or departures as may fairly come within the spirit of the appended claims.

I claim as my invention:

1. The method of preparing colloidal sulphur which includes: acidifying an alkaline solution of a sulphide containing a protein which is dispersed in alkaline solution and coagulated in acid solution, thereby precipitating sulphur and protein as a coagulated mass in which the sulphur particles are of colloidal dimensions; filtering and washing the precipitate; and thereafter mixing the precipitate with an alkaline solution to disperse the protein and suspend the colloidal sulphur.

2. The method of preparing colloidal sulphur which includes: acidifying an alkaline solution of a sulphide containing a casein which is dispersed in alkaline solution and coagulated in acid solution, thereby precipitating sulphur and casein as a coagulated mass in which the sulphur particles are of colloidal dimensions; filtering and washing the precipitates; and thereafter mixing the precipitate with an alkaline solution to disperse the casein and suspend the colloidal sulphur.

3. The method of making colloidal sulphur which includes: gradually adding acid to an alkaline sulphide solution containing casein to release free sulphur from combination and coagulate the casein, thereby precipitating a coagulated mass of casein and sulphur in which the sulphur particles are of colloidal dimensions; separating the coagulated mass from the solution; and mixing the precipitate with an alkaline solution to disperse the casein and suspend the sulphur in colloidal solution.

TADAICHI HASHIMOTO.